(12) United States Patent
Philipp

(10) Patent No.: US 10,836,588 B2
(45) Date of Patent: Nov. 17, 2020

(54) CHAIN BUFFER

(71) Applicant: Rotzinger AG, Kaiseraugst (CH)

(72) Inventor: Kurt Philipp, Grenzach-Wyhlen (DE)

(73) Assignee: ROTZINGER AG, Kaiseraugst (CH)

( * ) Notice: Subject to any disclaimer, the term of this patent is extended or adjusted under 35 U.S.C. 154(b) by 0 days.

(21) Appl. No.: 16/488,550

(22) PCT Filed: Feb. 22, 2018

(86) PCT No.: PCT/EP2018/054355
§ 371 (c)(1),
(2) Date: Aug. 23, 2019

(87) PCT Pub. No.: WO2018/153965
PCT Pub. Date: Aug. 30, 2018

(65) Prior Publication Data
US 2019/0375601 A1 Dec. 12, 2019

(30) Foreign Application Priority Data

Feb. 23, 2017 (CH) .......................................... 212/17

(51) Int. Cl.
*B65G 47/26* (2006.01)
*B65G 15/06* (2006.01)
*B65G 21/14* (2006.01)

(52) U.S. Cl.
CPC .......... *B65G 47/268* (2013.01); *B65G 15/06* (2013.01); *B65G 21/14* (2013.01)

(58) Field of Classification Search
CPC ............ B65G 47/5122; B65G 47/5131; B65G 47/5145; B65G 15/06; B65G 21/14
See application file for complete search history.

(56) References Cited

U.S. PATENT DOCUMENTS

| | | | | |
|---|---|---|---|---|
| 4,413,724 A * | 11/1983 | Fellner | ............... | B65G 47/5122 198/594 |
| 4,513,858 A * | 4/1985 | Fellner | ............... | B65G 47/5122 198/812 |
| 7,455,168 B2 * | 11/2008 | Monti | ............... | B65G 47/5122 198/347.1 |
| 9,896,271 B1 * | 2/2018 | Steeber | ............. | B65G 47/5122 |

(Continued)

FOREIGN PATENT DOCUMENTS

| CA | 2 364 216 A1 | 6/2003 |
|---|---|---|
| EP | 1 275 603 A1 | 1/2003 |

(Continued)

OTHER PUBLICATIONS

International Search Report dated May 16, 2018 in International Application No. PCT/EP2010/054355.

*Primary Examiner* — Mark A Deuble
(74) *Attorney, Agent, or Firm* — Xsensus LLP

(57) ABSTRACT

The buffering device serves to temporarily accept products from a product flow in the event of a downstream disruption obstructing the product flow and to deliver the accepted products after the disruption has been eliminated. As conveyor it uses an endless flat top chain, which passes through several loops formed by horizontal deflections in an upper and a lower level. The deflections are arranged in an alternately fixed and horizontally displaceable manner, such that the lengths of the loops are variable.

7 Claims, 2 Drawing Sheets

(56) References Cited

U.S. PATENT DOCUMENTS

Figure 1:
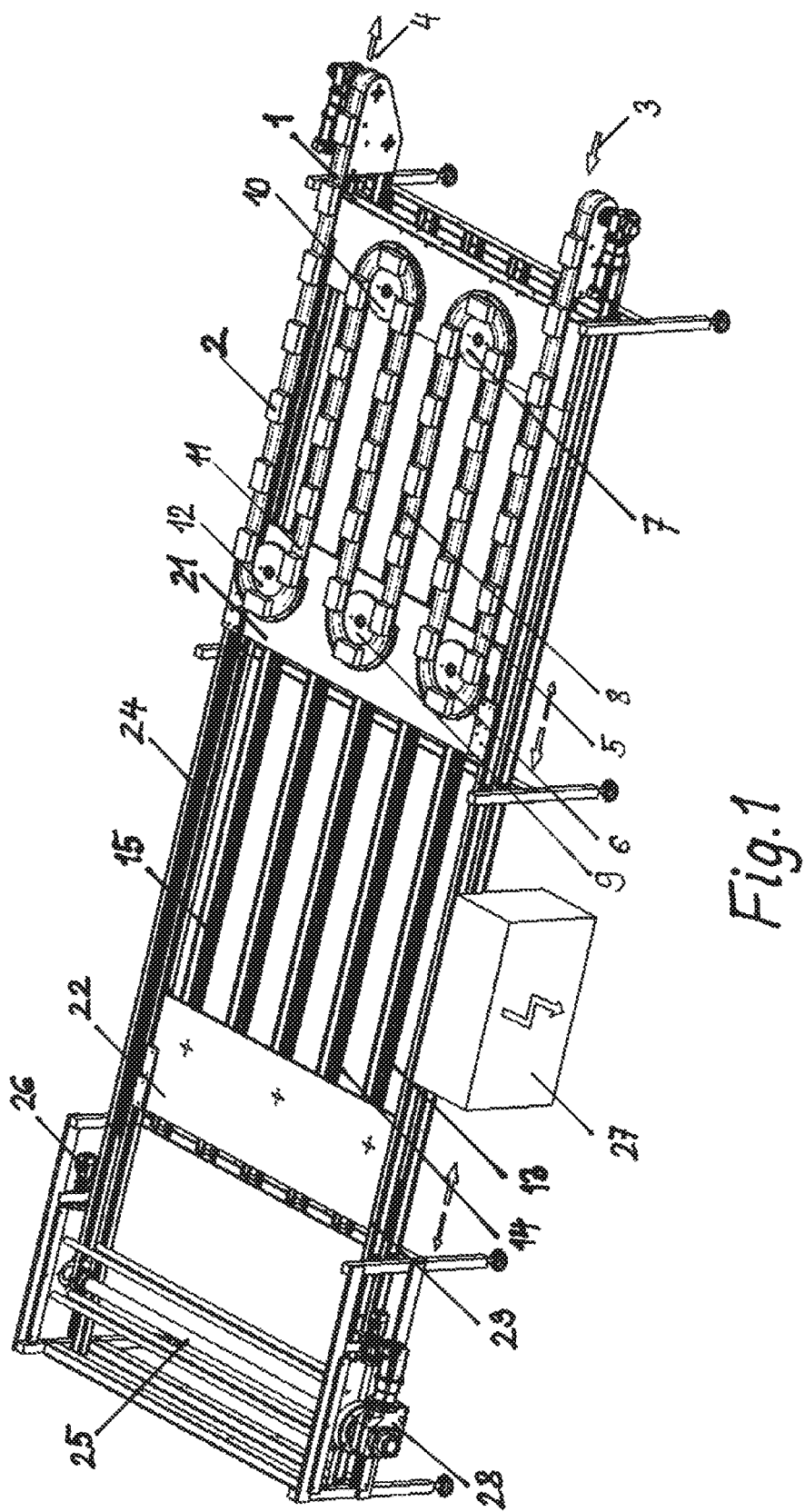

| | | | |
|---|---|---|---|
| 2002/0195317 A1* | 12/2002 | Wipf | B65G 47/5122 198/602 |
| 2012/0024660 A1* | 2/2012 | Seger | B65G 47/5131 198/347.1 |
| 2013/0062165 A1* | 3/2013 | Touitou | B65G 47/5131 198/606 |
| 2013/0284563 A1* | 10/2013 | Lopez | B65G 21/22 198/459.1 |
| 2015/0021143 A1* | 1/2015 | Seger | B65G 1/04 198/347.1 |

FOREIGN PATENT DOCUMENTS

| | | |
|---|---|---|
| EP | 1 845 039 A1 | 10/2007 |
| EP | 2 184 240 A1 | 5/2010 |
| WO | 2012/035280 A1 | 3/2012 |

* cited by examiner

CHAIN BUFFER

This application is a national stage (under 35 U.S.C. 371) of International Patent Application No. PCT/EP2018/054355, filed Feb. 22, 2018, claiming priority to Swiss Patent Application No. 00212/17, filed Feb. 23, 2017 both of which are herein incorporated by reference in their entirety.

The invention relates to a buffering device for temporarily accepting products from a product flow in the event of a downstream disruption in product flow and for delivering the temporarily accepted products after the disruption.

Buffering devices, or in abbreviated form buffers, which are often referred to as product flow regulators or intermediate caches, are known in many forms.

Bulk goods (e.g. foodstuffs such as chocolate bars or biscuits) are often packed in a plastic tray, tube pack or carton. In a food production line, the unpacked finished foodstuffs should be packed as quickly as possible. For this purpose, they are expedited to the packaging line. The packaging line usually consists of several machines connected in series, for example, a tube packaging machine for the primary packaging, then a multipack machine for the second packaging, a cartoning machine and finally a palletizer.

Each of these machines connected in series is prone to disruptions, in order to avoid stopping the entire line when a machine stops, thereby causing losses and reducing the efficiency of the line, buffering devices are integrated into the line. These buffering devices absorb the flow of bulk goods for a period of time. The buffering devices are looped into the product flow, they take the bulk goods in a synchronized manner at the inflow, and can flexibly store them for a certain time. After elimination of a disruption, as a function of the fill level of the buffer, the bulk goods are once again delivered to the downstream machines at a higher speed in order to reduce the fill level of the buffering device and to counteract an overfilling of the buffer.

The purpose of the invention is to provide a buffering device, the storage capacity of which can directly dynamically respond to an emerging need.

This is achieved by the characterizing features of claim 1 according to the invention.

For the purpose of this description, the following terms are specifically defined as indicated:

A "flat top chain" is a linked chain with three-dimensional chain links which are movable relative to each other, and which are usually made of molded plastic. The top side of these chain links is flat and serves as a support surface for bulk goods to be conveyed. These flat top chains are available in a variety of specifications in the market.

The side of the buffering device on which the products enter and exit is referred to as "front side" or "front", the opposite side as "back side" or "rear".

A "loop" refers to a bend of the flat top chain that is oriented towards the back side that serves to extend the length of the chain, at the end of which a deflection takes place.

The buffering device here is used to transport mostly packaged bulk goods, it is mostly used in the packaging area in the food and pharmaceutical industries. A mixing of the products does not take place since the proposed buffering device works on a first-in, first-out principle.

An exemplary embodiment of the buffering device according to the invention will be described below with reference to the accompanying drawings. The FIGS. show:

FIG. 1 a perspective view of a buffering device according to the invention

Figure 2:
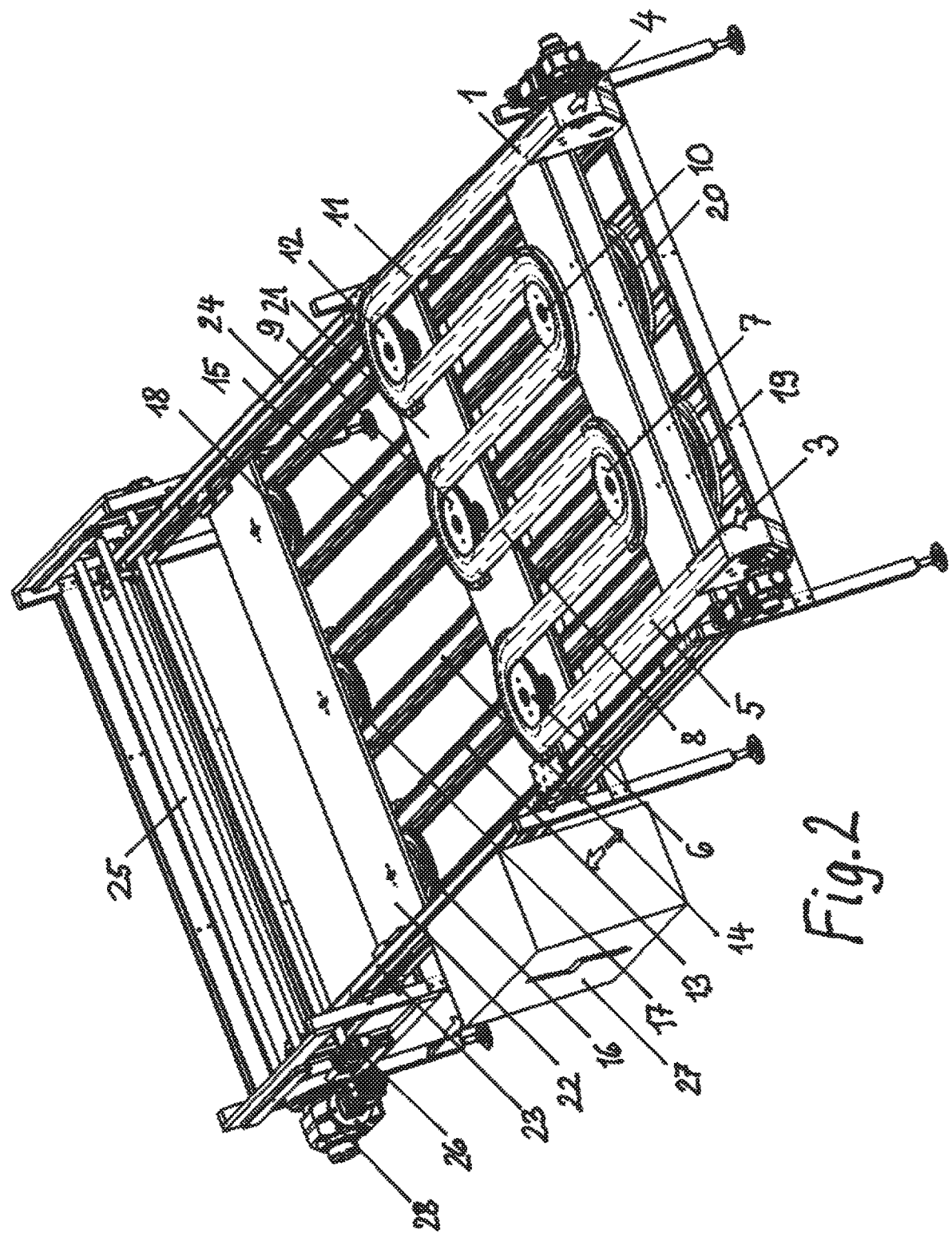

FIG. 2 a perspective view of the buffering device shown in FIG. 1 from a different angle A flat top chain 1 serves to convey bulk goods 2 from an inflow 3 to an outflow 4. The flat top chain is endless, wherein the portion serving to convey the bulk goods runs in an upper plane, whereas the remaining part runs in a plane arranged underneath.

This buffering device visibly has three loops in the upper level that serve to convey the bulk goods, which serve to extend the path of the bulk goods from the inflow to the outflow: A first loop 5 extends straight from the inflow to a rear deflection 5 and parallel again forward to a deflection 7 at the front of the buffer; a subsequent second loop 8 extends from the front deflection 7 to the rear, to a second rear deflection 6 and parallel forward to a second front deflection 10; a third loop 11 extends to the rear and via a third rear deflection 12 forward to the outflow.

On the lower level, the flat top chain also runs in three parallel loops 13, 14, 15 which are each guided in the rear region of the buffer in the same manner as the loops of the upper level by deflections 16, 17, 18 (FIG. 2). Just like in the upper level, in the lower level there are two front deflections 19, 20 between the loops, which are also shown in FIG. 2. In the loops of the lower level, the chain runs in the opposite direction to the loops of the upper level. It is also understood that in the lower level, the chain runs with its bearing surfaces facing downwards and therefore, as a consequence, is naturally empty.

At the inflow, the flat top chain is deflected vertically via a driven toothed sprocket from the lower level to the upper level. Accordingly, the chain is deflected by a driven toothed sprocket to the lower level at the outflow. The drives of the sprockets are commercially available servomotors with suitable transmissions.

The horizontal deflections are designed as flat-lying mounted wheels. In the upper level, the two horizontal deflection wheels 7, 10 are fixedly arranged between the loops on the front of the buffer, whereas the three horizontal deflection wheels 6, 9, 12 for the respective rear deflection of the loops are arranged on a horizontally displaceable slide 21. Similarly, the front deflecting wheels 19, 20 on the lower level are likewise stationary, vertically arranged under the corresponding upper-level deflecting wheels, whereas the rear deflecting wheels are arranged on a horizontally displaceable slide 22. As a result of the displacement of the slide 21 of the upper, which is to say, the conveying plane, towards the rear, the loops 5, 8, 11 are lengthened and thus the conveying length between inflow and outflow is increased. As a result, the storage capacity of the conveyor line is increased. Conversely, by sliding the slide 21 forward, the loop length and thus the conveying length are shortened, so the storage capacity is reduced.

The extension or shortening of the loops of the upper, which is to say, the conveying plane, brings about a difference in speed between inflow and outflow drive. If the inflow speed and the outflow speed are equally quick, there will be no change in the lengths of the loops. If, due to a downstream disruption, the inflow speed is greater than the outflow speed, then the chain buffer fills with product since the chain loops on the top are extended. Conversely, if the outflow speed is greater, the buffer will empty and the chain loops will shorten accordingly. If the buffer is empty, the chain loops are shortened as much as possible; if the buffer is full, the chain loops are extended to the maximum.

If the length of the loops on the upper level is changed, then the length of the loops of the lower level must at the same time be changed in an opposite direction, which is to say, with an empty buffer, the loops of the lower level have their maximum length and the slide 22 is at the rear end, whereas with a full buffer, the lower loops have their minimum length with the slide in its foremost position. The underlying chain loops thus serve as a type of chain supply.

The two displaceable slides 21, 22, on which the horizontal deflections of the chain loops are to be found, are coupled with two tows such as toothed belts 23, 24 arranged on both sides. Instead of toothed belts, chains, wire cables, etc. can be used. The pair of toothed belts, as shown in FIG. 3, is deflected on the back of tile buffer via a shaft 25. This deflection shaft is horizontally displaceable on both sides by means of servo-driven threaded spindles 26. In so doing, the chain loops that are lying in tile two levels can be stretched in a defined manner by means of the slides coupled with the toothed belts.

Of course, embodiments with only one or two loops, but also those with four or more loops are possible instead of the embodiment described above with three parallel loops. Especially when the buffer has a large chain length available, a defined and optimum pretension of the chain loops is required. A control unit 27 can dispense the induced torque of the paired servo spindles so that there is always an optimum pretension of the two chain loops.

The longer the chain, the greater the buffering capacity. A longer chain also has a greater length extension during operation. On the other hand, the required take-up length by means of the number of top and bottom chain loops is reduced by the number of loops. This is an advantage that significantly reduces the overall length of the chain buffer.

A further advantage of the arrangement of the outboard-arranged toothed belt pairs is that possible tilting forces in the likewise outboard-arranged slide guides are practically equalized.

For larger buffers, the described expansion shaft can also be equipped with an additional servo motor as servo drive 28. This drive then powers, in a superimposed manner, the two slides by means of the two pairs of toothed belts. This makes it possible to reduce the forces in the conveyor chain, because the share of force for the propulsion of the two slides is eliminated.

Another advantage of the additional servo drive is that the control unit to incrementally synchronize this drive with inflow drive and outflow drive, so that the same relieves the conveyor chain in terms of force depending on fill level upon filling or emptying of the buffer. As a result, large buffer capacities can be realized with correspondingly large chain lengths.

Due to the multi-looped configuration on the one hand, and the arrangement of the chain loops in two superimposed planes on the other hand, a large buffer capacity can be made possible with a reduced length. The number of chain loops, as mentioned, is arbitrary and depends largely on the available width. The diameters of the horizontal chain deflections depend on the lengths and widths of the products. The efficiency of the proposed chain buffer is extraordinarily high at up to 90%. The utilization factor is the quotient made of the usable chain length with regard to its endless length. The usable chain length here is the portion of the endless length that can be used as a buffer. For example, for a usable chain length of 120 m, such a buffer only requires an endless length of 132 m. Comparable buffers of the prior art have a much lower degree of efficiency.

Due to the multi-looped configuration, a flat design of the buffer also results. Thus, two or more buffers can be stacked vertically one above the other. In this manner, with a given area, buffers of several lines can be arranged one above the other to save space. Moreover, for a given area, it is possible to multiply the buffer capacity by a plurality of buffers arranged one above the other, the outflows and inflows of which are connected to one another by conveying technology.

The invention claimed is:

1. A buffering device for temporarily accepting products from a product flow in the event of a downstream disruption in product flow and for delivering the temporarily accepted products after the disruption has been eliminated, the buffering device comprising:
 an endless flat top chain that passes through a plurality of loops in an upper and a lower plane by horizontal deflections,
 wherein the horizontal deflections are in an alternately fixed and horizontally displaceable manner, such that the loops are variable in length,
 wherein the horizontal deflections in the upper plane are mounted on a first slide in the upper plane, and the horizontal deflections in the lower plane are mounted on a second slide in the lower plane,
 wherein the first and the second slides are coupled together such that horizontal displacements of the slides are in opposite directions, and
 wherein the first slide includes a first plurality of the horizontal deflections which each move with a movement of the first slide, and the second slide includes a second plurality of the horizontal deflections which each move with a movement of the second slide.

2. The buffering device according to claim 1, wherein: the chain loops that run in the upper plane serve for product conveyance and the chain loops in the lower plane serve as a chain supply.

3. The buffering device according to claim 1, wherein: the chain portion running in the upper plane is connected to the chain portion in the lower plane by vertically driven deflections.

4. The buffering device according to claim 3, wherein: there is a product inflow and a product outflow, and that the vertically driven deflections are located near the product inflow and the product outflow.

5. The buffering device according to claim 1, wherein: on both slides there are deflected tows in parallel and opposite the product inflow and outflow for the coupling of the first slide to the second slide.

6. The buffering device according to claim 5, further comprising:
 tensioning means acting on the deflection of the deflected tows for tensioning the flat top chain.

7. The buffering device according to claim 5, further comprising:
 a deflection drive to support an extension or shortening of the chain loops.

* * * * *